US012705789B2

(12) United States Patent
Tojo et al.

(10) Patent No.: US 12,705,789 B2
(45) Date of Patent: Aug. 11, 2026

(54) INFORMATION PROCESSING APPARATUS, ORIENTATION ESTIMATION METHOD, AND STORAGE MEDIUM

(71) Applicant: CANON KABUSHIKI KAISHA, Tokyo (JP)

(72) Inventors: Hiroshi Tojo, Tokyo (JP); Kosuke Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 269 days.

(21) Appl. No.: 18/615,824

(22) Filed: Mar. 25, 2024

(65) Prior Publication Data

US 2024/0331192 A1 Oct. 3, 2024

(30) Foreign Application Priority Data

Mar. 28, 2023 (JP) ................................ 2023-051692

(51) Int. Cl.
*G06T 7/73* (2017.01)
*G06T 7/194* (2017.01)
(Continued)

(52) U.S. Cl.
CPC ................ *G06T 7/73* (2017.01); *G06T 7/194* (2017.01); *G06T 7/50* (2017.01); *G06V 10/44* (2022.01);
(Continued)

(58) Field of Classification Search
CPC .. G06T 7/73; G06T 7/194; G06T 7/50; G06V 10/44; G06V 2201/07
See application file for complete search history.

(56) References Cited

U.S. PATENT DOCUMENTS

2007/0036432 A1* 2/2007 Xu ......................... G06V 10/28 382/173
2017/0358104 A1* 12/2017 Zhang ....................... G06T 7/73
(Continued)

FOREIGN PATENT DOCUMENTS

WO 2015/186436 A1 12/2015

OTHER PUBLICATIONS

Abhinav Gupta, et al., From 3D Scene Geometry to Human Workspace, Conference on Computer Vision and Pattern Recognition (CVPR), 2011.

(Continued)

*Primary Examiner* — Mohammed H Zuberi
(74) *Attorney, Agent, or Firm* — Canon U.S.A., Inc. IP Division

(57) ABSTRACT

An information processing apparatus includes at least one processor, and at least one memory storing executable instructions which, when executed by the at least one processor, cause the at least one processor to perform operations including acquiring an image, detecting an entire human body from the acquired image, estimating a skeleton of the detected entire human body and generating skeleton information about the skeleton of the entire human body, extracting a first feature quantity based on the generated skeleton information, extracting a second feature quantity based on a clipped image including the detected entire human body, and estimating an orientation of the detected entire human body based on a third feature quantity in which the first and second feature quantities are connected.

16 Claims, 6 Drawing Sheets

(51) Int. Cl.
*G06T 7/50* (2017.01)
*G06V 10/44* (2022.01)

(52) U.S. Cl.
CPC ............... *G06T 2207/20044* (2013.01); *G06T 2207/20084* (2013.01); *G06V 2201/07* (2022.01)

(56) References Cited

U.S. PATENT DOCUMENTS

| | | | | |
|---|---|---|---|---|
| 2019/0102613 | A1* | 4/2019 | Watanabe | G06T 7/194 |
| 2022/0138459 | A1* | 5/2022 | Peng | G06T 7/70<br>382/103 |
| 2022/0270261 | A1* | 8/2022 | Dudovitch | G06T 7/11 |
| 2022/0270265 | A1* | 8/2022 | Dudovitch | G06F 3/04845 |
| 2024/0331192 | A1* | 10/2024 | Tojo | G06V 10/44 |

OTHER PUBLICATIONS

Soshi Shimada, et al., HULC: 3D HUman Motion Capture with Pose Manifold SampLing and Dense Contact Guidance, arXiv:2205.05677v4, Jul. 26, 2022.
Ji'An Tao, et al., Scene-Perception Graph Convolutional Networks for Human Action Prediction, International Joint Conference on Neural Networks (IJCNN), 2021.
Alexandru O. Balan, et al., Shining a Light on Human Pose: On Shadows, Shading and the Estimation of Pose and Shape, 2007 IEEE 11th International Conference on Computer Vision, 2007, Santa Clara, USA.

* cited by examiner

201
VIDEO IMAGE ACQUISITION UNIT
202
PERSON DETECTION UNIT
203
SKELETON ESTIMATION UNIT
204
ORIENTATION ESTIMATION UNIT
205
USER NOTIFICATION DETERMINATION UNIT
206
DISPLAY UNIT 601
602
603
604
605
606
607
608
609
610
611
612
613
614

INFORMATION PROCESSING APPARATUS, ORIENTATION ESTIMATION METHOD, AND STORAGE MEDIUM

BACKGROUND OF THE INVENTION

Field of the Invention

The present invention relates to an information processing apparatus, an orientation estimation method, and a storage medium.

Description of the Related Art

A technique for estimating the orientation of the entire body of a person based on a video image of a monitoring camera has recently been applied to the maintenance of customer security in stores and the monitoring activities in cities.

As a technique for estimating the orientation of the entire body, there has conventionally been proposed a technique for estimating skeleton information (joints) for the entire body in a video image and estimating the orientation based on joints. However, orientation estimation has been difficult in a case where different orientations are seen as the same orientation based on joints.

WO 2015/186436 discusses a technique for detecting an object, such as a chair, around a person and distinguishing between an "orientation of doing squats" and an "orientation of sitting down on a chair" based on the joints of the target person and the distance to the object.

SUMMARY OF THE INVENTION

According to an aspect of the present invention, an information processing apparatus includes at least one processor, and at least one memory storing executable instructions which, when executed by the at least one processor, cause the at least one processor to perform operations including acquiring an image, detecting an entire human body from the acquired image, estimating a skeleton of the detected entire human body and generating skeleton information about the skeleton of the entire human body, extracting a first feature quantity based on the generated skeleton information, extracting a second feature quantity based on a clipped image including the detected entire human body, and estimating an orientation of the detected entire human body based on a third feature quantity in which the first and second feature quantities are connected.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings. The following exemplary embodiments are to be considered as illustrative examples for achieving the present invention, and may be corrected and modified as required depending on the configuration of an apparatus according to the present invention and other various conditions. The present invention is not limited to the following exemplary embodiments. Parts of the following exemplary embodiments may be suitably combined.

Figure 1:
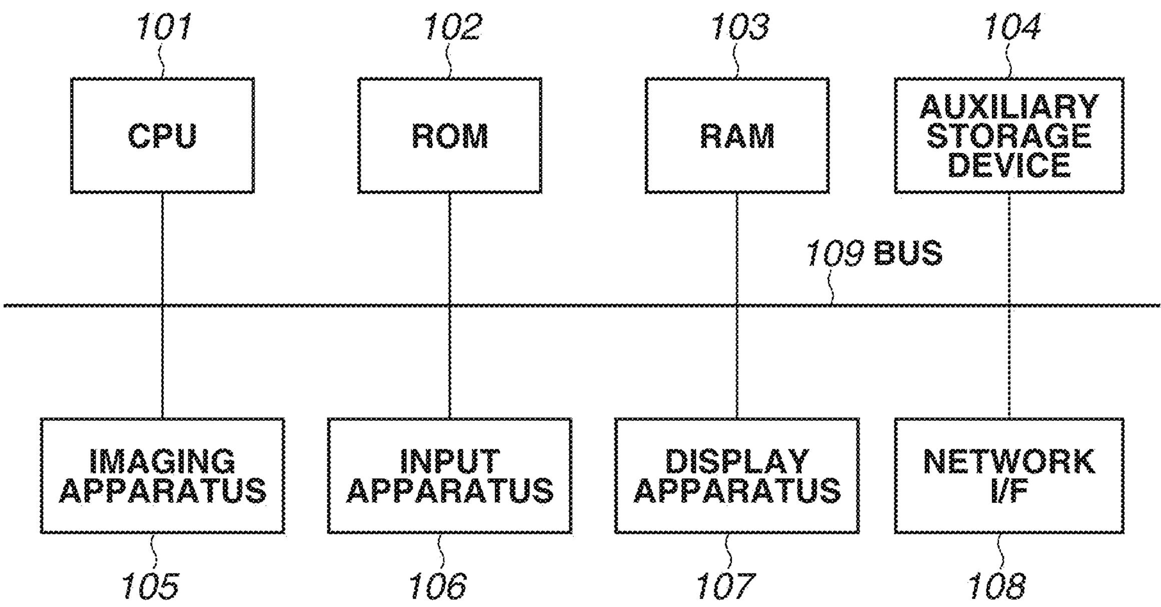
FIG. 1 illustrates an example of a hardware configuration of an information processing apparatus according to an exemplary embodiment.

A first exemplary embodiment of the present invention will be described below. FIG. 1 is a block diagram illustrating a hardware configuration of an information processing apparatus according to the present exemplary embodiment. A central processing unit (CPU) 101 executes instructions according to programs stored in a read only memory (ROM) 102 and/or a random access memory (RAM) 103. The ROM 102 is a nonvolatile memory for storing programs according to the present invention and other programs and data to be used for control. The RAM 103 is a volatile memory for storing frame image data and temporary data such as a pattern determination result.

An auxiliary storage device 104 is a rewritable auxiliary storage device, such as a hard disk drive and a flash memory, for storing image information, programs, and various settings. These pieces of information are transmitted to the RAM 103 and used to execute a program or used as data by the CPU 101.

An imaging apparatus 105 includes an imaging lens, an image sensor such as a charge coupled device (CCD) sensor and a complementary metal oxide semiconductor (CMOS) sensor, and a video image signal processing unit. The imaging apparatus 105 captures video images. An input apparatus 106, which is, for example, a keyboard and/or a mouse, allows input of an instruction from the user. A display apparatus 107 which is, for example, a cathode ray tube (CRT) or a liquid crystal display (LCD) displays results of processing to the user. A network interface (I/F) 108 which is, for example, a modem or a local area network (LAN) that connects with a network, such as the Internet and an intranet. A bus 109 connects the above-described units to enable data input and output with each other. The CPU 101 reads software for implementing processing in each step of a flowchart (described below) from the auxiliary storage device 104 and the RAM 103, and then executes the software.

Figure 2:
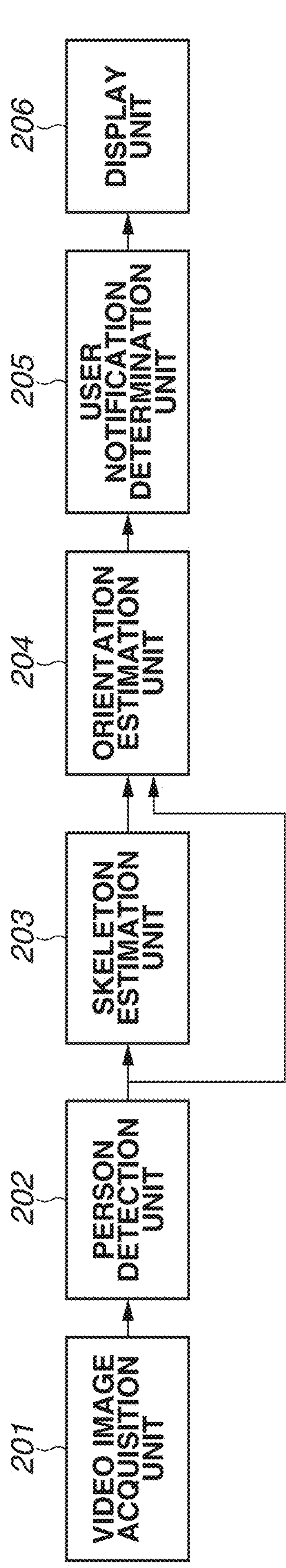
FIG. 2 illustrates a functional configuration of the information processing apparatus according to the exemplary embodiment.

FIG. 2 illustrates a functional configuration of the information processing apparatus according to the present exemplary embodiment. A video image acquisition unit 201 includes the imaging apparatus 105 and captures video images (still images). A person detection unit 202 detects the region of a person (human body) from a video image acquired by the video image acquisition unit 201. According to the present exemplary embodiment, the person detection unit 202 detects the region of an entire human body.

A skeleton estimation unit 203 estimates the skeleton of the entire human body from the entire body region detected by the person detection unit 202, and generates joint points of the entire body as skeleton information for the entire human body.

Figure 3:
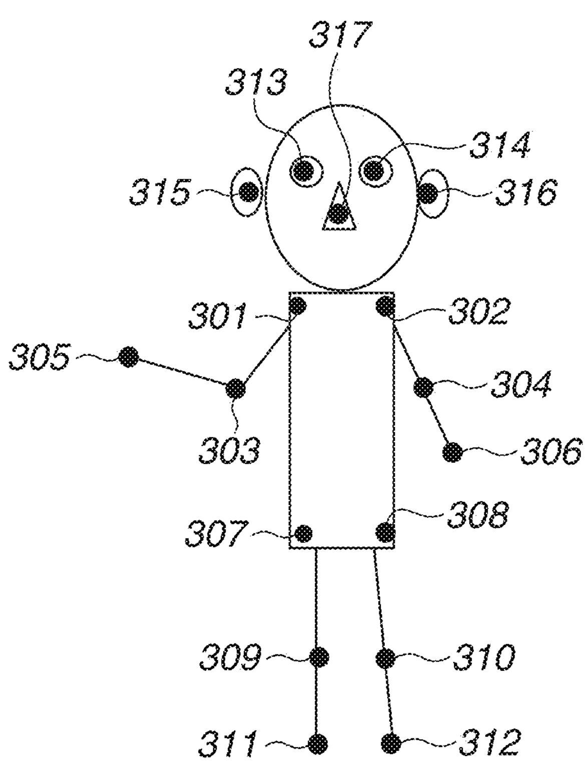
FIG. 3 illustrates an example of a skeleton estimation result.

A joint point represents a connecting position between human body parts. According to the present exemplary embodiment, joint points include the shoulders 301 and 302, elbows 303 and 304, wrists 305 and 306, waists 307 and 308, knees 309 and 310, and ankles 311 and 312 as illustrated in FIG. 3. Facial organs including the eyes 313 and 314, a nose 317, and ears 315 and 316 are also handled as joint points.

An orientation estimation unit 204 estimates the orientation based on the skeleton information estimated by the skeleton estimation unit 203 and the entire body region detected by the person detection unit 202, where the orientation in which at least three points of detected human body parts are in contact with the ground (hereinafter referred to as a 3-or-more point grounding orientation), such as a lying position and a sitting position, is detected.

A user notification determination unit 205 determines whether a notification to the user is to be issued, based on a result of the estimation of the orientation estimation unit 204. A display unit 206 includes a display apparatus 107 that displays a notification to the user when the user notification determination unit 205 determines that a notification to the user is to be issued.

Figure 4:
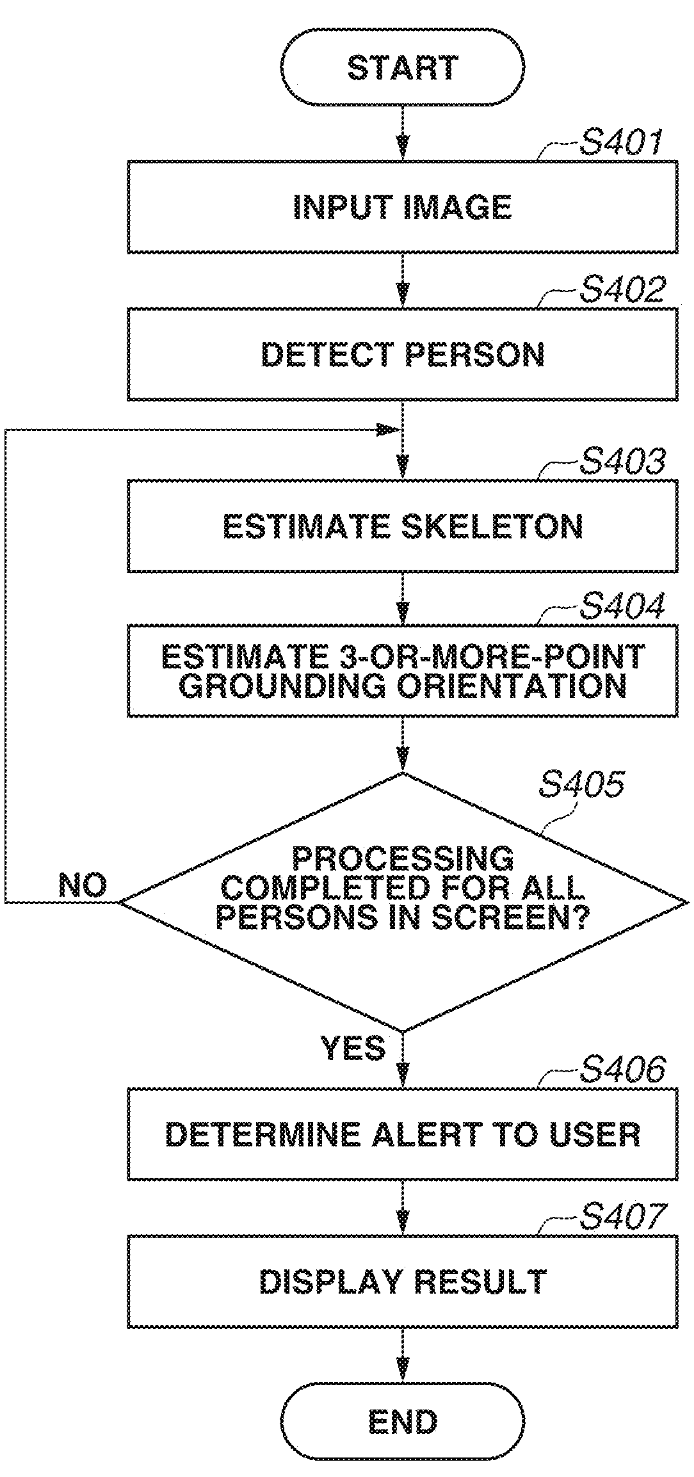
FIG. 4 is a flowchart illustrating processing of the information processing apparatus according to the exemplary embodiment.

Processing of the information processing apparatus according to the present exemplary embodiment will be described below with reference to the flowchart in FIG. 4. In step S401, the video image acquisition unit 201 acquires a video image from the imaging apparatus 105 on a frame image unit basis. In step S402, the person detection unit 202 detects the entire body region of a person from among the frame images.

Specific examples of methods for person detection include a method based on a convolutional neural network (CNN). Applicable methods are not limited thereto, and any other methods with which the entire body region is detectable is applicable. Examples of applicable methods include detecting the contour of the subject and comparing edge information for the contour with prestored information about the contour of the person, to detect the entire body region.

The entire body region is represented by the x- and y-coordinates of two points, specifically, upper left and lower right points) of a square surrounding the person. In step S403, the skeleton estimation unit 203 estimates the skeleton of the person from the entire body region and outputs a likelihood map of joint points corresponding to the entire body region.

Examples of specific methods for skeleton estimation include a CNN-based method. With this method, the likelihood of being a joint for each pixel in the entire body region is determined to generate joint likelihood maps for joint points (the likelihood is a value from 0 to 1, and a value closer to 1 indicates higher likelihood). In the present exemplary embodiment, 17 different joint points are estimated and therefore 17 different joint likelihood maps are generated. In each joint likelihood map, the coordinates with the highest likelihood become a candidate for joint point coordinates. Although the joint point coordinates may be output, the present exemplary embodiment outputs 17 different likelihood maps.

The present exemplary embodiment is not limited to a CNN-based method as long as the coordinates of joint points are estimable. Examples of applicable methods include estimating the coordinates based on the contour of a person and the relative positions of joint points based on the general human body structure. The present exemplary embodiment is configured to perform skeleton estimation on the entire body region obtained from the entire screen through person detection. However, the present exemplary embodiment may be configured to perform skeleton estimation on the full screen to obtain joints first and then sum up the joints for each person based on the relations between joints.

In step S404, the orientation estimation unit 204 estimates whether the person is in a 3-or-more grounding orientation based on the joint likelihood maps and the image of the entire body region. The orientation estimation unit 204 outputs the likelihood of a 3-or-more-point grounding orientation in association with the entire body region. The likelihood takes a value from 0 to 1. The value closer to 1 indicates higher likelihood that the person is in a 3-or-more-point grounding orientation. A specific method for the orientation estimation unit 204 will be described below.

In step S405, the CPU 101 determine whether the operations in steps S403 and S404 have been completed for all persons (entire body regions) included in the current frame image. If the CPU 101 determine that the operations have been completed for all persons, the processing proceeds to step S406. Otherwise, the processing returns to step S403 and repeats the operations from step S403.

In step S406, the user notification determination unit 205 determines whether to issue an alert to the user based on the likelihood output by the orientation estimation unit 204. The CPU 101 compares the likelihood of a 3-or-more-point grounding orientation with a predetermined threshold value for all of the entire body regions detected from the frame image. If the likelihood exceeds the threshold value, the CPU 101 determines that an alert is to be issued and outputs (the square coordinates of) the entire body region and the likelihood of a 3-or-more-point grounding orientation.

In step S407, the display unit 206 displays a result of the determination in step S406 to the user. For example, the display unit 206 may display a message "There is a person falling down" or superimpose the square surrounding a person falling down, on the camera video image. The display unit 206 may display a numerical value indicating the likelihood of a 3-or-more-point grounding orientation or a color or bar chart according to the magnitude of the numerical value.

This completes the description of the processing of the information processing apparatus. The processing up to the display of the result of the orientation estimation has been sequentially described above. The CPU 101 constantly repeats all the steps until the information processing apparatus is deactivated.

Figure 5:
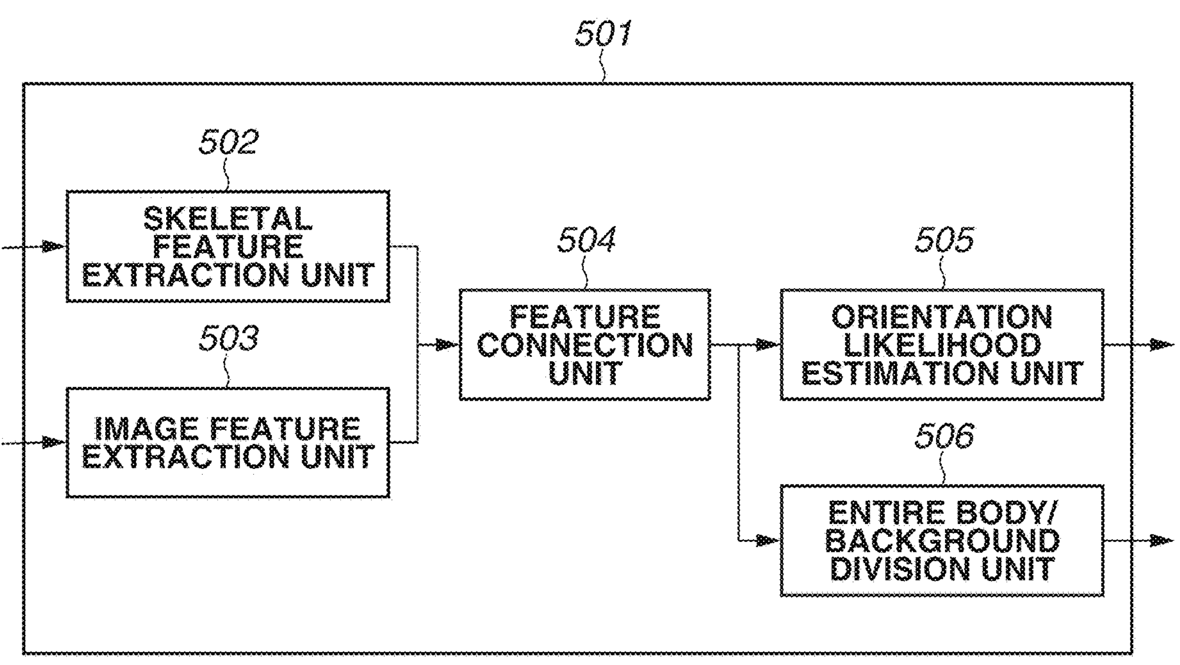
FIG. 5 illustrates a structure of a neural network of an orientation estimation unit.

The orientation estimation unit 204 will be described in detail below. The orientation estimation unit 204 is implemented by a trained neural network, which is the neural network that has completed learning through a learning method described below. The structure and processing of the network will be described below with reference to FIG. 5.

An orientation estimation network 501 configures the orientation estimation unit 204.

Component units of the network will be described below according to the order of processing.

A skeletal feature extraction unit (first extraction unit) 502 includes a plurality of convolutional layers and a plurality of pooling layers. The skeletal feature extraction unit 502 extracts a skeletal feature map (first feature quantity) based on the joint likelihood maps output by the skeleton estimation unit 203.

The joint likelihood maps are input because the orientation of the entire body is determined by the skeleton as a matter of course. In addition, that is because maps are useful as information for distinguishing between the entire body and the background region in a clipped image of the entire body. The joint likelihood maps are intended to be reflected to image features (described below) as information about the relation between the entire body and the background.

Other networks are also applicable as long as a skeletal feature map is extractable. Examples of other applicable networks include a residual neural network in which a plurality of residual blocks is connected in series, with the inputs of the convolutional layers skip-connected to their outputs (for addition). Examples of applicable networks also include a Visual Transformer (ViT) method in which an image is divided into patches to derive tokens (vectors) and relations between tokens are extracted.

An image feature extraction unit (second extraction unit) 503 includes a plurality of convolutional layers and a plurality of pooling layers. The image feature extraction unit 503 inputs the clipped image including the entire body and the background around the entire body and extracts an image feature map (second feature quantity), based on the entire body region detected by the person detection unit 202.

To obtain an image feature map reflecting information about the relation between the entire body and the background, it is desirable that the clipped image sufficiently includes the background around the entire body. Thus, the image feature extraction unit 503 may input, as a clipped image, the entire body region detected by the person detection unit 202 with a predetermined margin applied in the vertical and horizontal directions.

The image feature extraction unit 503 may use a residual neural network or ViT as in the skeletal feature extraction unit 502 and also use any other networks as long as an image feature map is extractable.

A feature connection unit 504 connects image feature maps with skeletal feature maps.

According to the present exemplary embodiment, the joint likelihood maps to be input to the skeletal feature extraction unit 502 are resized and padded so that all joints have predetermined heights H and widths W, and a skeletal feature map is output with H/K×W/K (K: predetermined constant)×C (the number of channels). The image feature extraction unit 503 also subjects a clipped image to be input to resizing and padding so that all joints have heights H×widths W, and obtains an image feature map with H/K×W/K×C. The feature connection unit 504 connects these maps to generate a connected feature map with H/K×W/K×2×C.

According to the present exemplary embodiment, the skeletal feature map and the image feature map have the same size. If the two feature maps have different sizes, the feature connection unit 504 may adjust the sizes of the feature maps, by, for example, downsizing the larger feature map, before connecting these feature maps.

An orientation likelihood estimation unit 505 estimates the likelihood of a 3-or-more-point grounding orientation in which at least three points of detected human body parts are in contact with the ground, based on the connection feature map. The orientation likelihood estimation unit 505 includes Multi Layer Perceptron (MLP), defines binary classification or an orientation class other than 3-or-more-point grounding orientations, such as a standing position, and handles the problem as a multi-class problem.

The entire body/background division unit (relation information estimation unit) 506 includes a fully convolutional network (FCN) and determines the likelihood of division categories ("entire body" and "background") for each pixel in the clipped image (the likelihood is a value from 0 to 1, and a value closer to 1 indicates higher likelihood).

The entire body/background division unit 506 can divide the clipped image into the entire body and the background by selecting the highest likelihood category for each pixel. As a method for category division, finer category division is also effective. This point will be described below.

A method that is performed by the orientation estimation unit 204 to perform learning of a neural network will be described below.

Training data will now be described. A combination of a clipped image of the entire body to be input to the orientation estimation unit 204 and the skeletal feature map acquired from the clipped image of the entire body via the skeleton estimation unit 203 is prepared. Correct answer data is prepared, where the correct date includes a label indicating whether the clipped image of the entire body and the skeletal feature map each indicate a 3-or-more-point grounding orientation, and a label image having a label of the entire body or background for each pixel of the clipped image of the entire body.

The clipped image of the entire body and the skeletal feature map are input to the orientation estimation network 501, and learns a task for estimating a 3-or-more-point grounding orientation based on the output of the orientation likelihood estimation unit 505 and the correct answer label of a 3-or-more-point grounding orientation. Of course, the image feature extraction unit 503 may be subjected to pre-training with a general image classification task in advance.

According to the present exemplary embodiment, a task for dividing the clipped image into the entire body and the background is added in addition to the task for estimating a 3-or-more-point grounding orientation to perform multi-task learning. This reflects the information about the relation between the person and the background to the image feature map to be extracted by the image feature extraction unit 503. This operation will be described below with reference to FIG. 6.

Figure 6:
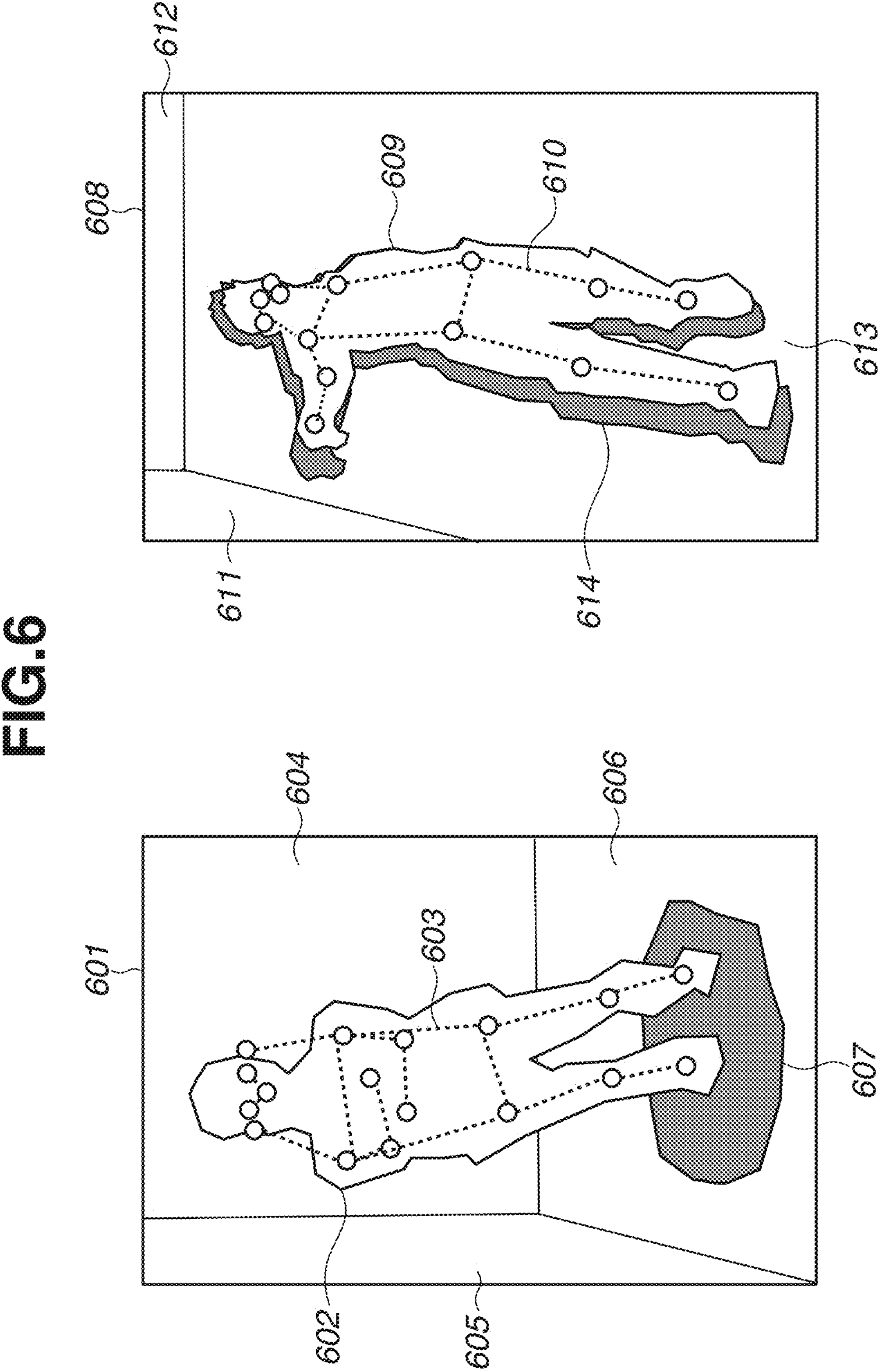
FIG. 6 illustrates examples of entire bodies and backgrounds in clipped images of a standing position and a 3-or-more-point grounding orientation.

FIG. 6 illustrates a clipped image 601 of a standing position and a clipped image 608 for a 3-or-more-point grounding orientation (lying position). Each of contours 602 and 609 indicates the boundary between the person and the background.

The contours 603 and 610 represented by circles and dotted lines schematically illustrate the skeleton information estimated by the skeleton estimation unit 203. Circles indicate the positions of peaks in each joint likelihood map, and dotted lines indicate portions connecting these positions. It is difficult to determine which is a standing position or a lying position only with the skeleton information (contours 603 and 610). However, the vicinities of the entire bodies include information useful for distinguishing between the two different orientations. FIG. 6 illustrates wall surfaces 604, 605, 611, and 612 and floor surfaces 606 and 613. For a standing position (clipped image 601), the floor surface 606 is present only around the lower body. For a lying position (clipped image 608), the floor surface 613 is present around the entire body.

FIG. 6 also illustrates shadows 607 and 614. For the standing position (clipped image 601), the shadow 607 is present only around the feet. For the lying position (clipped image 608), the shadow 614 is present around the entire body.

The learning of the task for dividing the image into the entire body and the background enables the image feature extraction unit 503 to extract features of the floor surface and shadow around the entire body for the lying position, thus enabling the orientation likelihood estimation unit 505 to estimate the likelihood of a 3-or-more-point grounding orientation.

The division category "background" may be replaced with division categories "floor surface" and "background other than floor surface" to enable dividing the background into a floor surface and other than the floor surface. This enables the image feature extraction unit 503 to clearly recognize the feature of the floor surface. Adding a division category "shadow" so as to divide a shadow region enables recognizing the shape of the shadow due to a difference in orientation.

Setting division categories "floor surface" and "wall surface" to divide the background into a floor surface and wall surfaces enables obtaining information about the perspective (imaging angle). As illustrated in FIG. 6, there is a difference in appearance (shape) of the entire body between a lying position and a standing position even for images captured from the same high angle. For the contour 602 captured from a high angle, the upper body appears in a larger size than the lower body in comparison with the entire body captured from the horizontal direction. For the contour 609, the entire body appears in a size similar to the entire body captured from the horizontal direction. Accordingly, dividing the floor surface, the wall surfaces, and the entire body enables reflecting the relation between the imaging direction and the variation in appearance (ratios of the upper and lower bodies) of the person to the image feature map to be output by the image feature extraction unit 503. Further dividing the entire body region into the upper and lower bodies (dividing the division category "entire body" into "upper body" and "lower body") enables further clearly reflecting the above-described feature to the image feature map.

To handle a case where a person sits down while facing the front in an "orientation of sitting down on a chair", a division category "chair" may be included. If the feature of a "chair" is seen around the person in the image feature map, the learning is performable in such a manner that the likelihood of a 3-or-more-point grounding orientation decreases.

Using the orientation estimation network 501 that has trained in the above-described manner enables accurately estimating a 3-or-more-point grounding orientation. Since the entire body/background division unit 506 is an essential part in the learning, an omitted network may be used by the orientation estimation unit 204.

Although, in the present exemplary embodiment, a skeletal feature map is input to the orientation estimation unit 204 as skeleton information, the present exemplary embodiment is not limited thereto. For example, each joint peak detected from the skeletal feature map and represented by joint point coordinates may also be input to the orientation estimation unit 204. A skeleton image formed by connecting joint points with line segments may also be input to the orientation estimation unit 204.

According to the present exemplary embodiment, the entire body/background division unit 506 adds an image division task so that the information about the relation between the entire body and the background is reflected to the image feature map output from the image feature extraction unit 503, thus estimating a 3-or-more-point grounding orientation. However, the task to be added is not limited to the image division task but any task is applicable as long as the information about the relation between the entire body and the background is reflectable. For example, a task for recursively obtaining the imaging angle itself is also applicable. This enables reflecting the relation between the imaging angle and the appearance of the entire body to the image feature map, as described above. In addition, depth information for each pixel may be estimated. This enables reflecting the depth difference between each portion of the entire body and the floor surface (relation information) to the image feature map.

As described above, the present exemplary embodiment makes it possible to extract an image feature reflecting the information about the relation between the entire body and the background from a clipped image including the background around the entire body. This enables estimating the orientation of the entire body even if no background object is present or no background object is detectable. This improves the estimation accuracy for a 3-or-more-point grounding orientation, such as a lying position and a sitting position.

Other Exemplary Embodiments

Although the present exemplary embodiment displays results of processing to the user, it is also possible to start recording a video image in response to detection of a 3-or-more-point grounding orientation, by using a video image recording unit, and apply meta information indicating the detection to the detection time in the video image to be recorded. Applying the meta information in this way enables searching for the video image of a 3-or-more-point grounding orientation at the recording time.

In the present exemplary embodiment, all functions are built in one apparatus. In another embodiment, a video image acquired from the video image acquisition unit 201 may be transmitted to a cloud, and processing of the person detection unit 202, the orientation estimation unit 204, and the user notification determination unit 205 may be performed on the cloud. Alternatively, only the processing performed by the neural network according to the present exemplary embodiment may be performed on the cloud, and other processing may be performed by the information processing apparatus.

As described above, the processing performed by using the neural network may be executed by a CPU different from the CPU 101 of the information processing apparatus. Alternatively, the information processing apparatus may include a plurality of CPUs each of which may take charge of executing either the processing executable through the neural network or other processing.

The object of the present exemplary embodiment may also be achieved by the following method. A recording medium (storage medium) recording program codes of software for implementing the functions of the above-described exemplary embodiments is supplied to a system or apparatus. Then, a computer (including a CPU, a micro processing unit (MPU), or a graphics processing unit (GPU)) of the system or apparatus reads and executes the program codes stored in the recording medium. In this case, the program codes themselves read from the recording medium implement the functions of the above-described exemplary embodiments, and the recording medium recording the program codes is included in the present invention.

The functions of the above-described exemplary embodiments may be implemented not only by the computer executing the read program codes but also by the operating system (OS) that is operating on the computer executing part or whole of actual processing based on instructions of the program codes.

The functions of the above-described exemplary embodiments may also be implemented with the following method. The program codes read from the recording medium are written in a memory included in a function expansion card inserted into the computer or a function expansion unit connected to the computer. Subsequently, the CPU included in the function extension card or the function extension unit may partially or entirely execute actual processing based on instructions of the computer program codes.

If the present exemplary embodiment is applied to the above-described recording medium, program codes corresponding to the above-described flowchart are to be stored in the recording medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2023-051692, filed Mar. 28, 2023, which is hereby incorporated by reference herein in its entirety.

What is claimed is:

1. An information processing apparatus comprising:

at least one processor; and at least one memory storing executable instructions which, when executed by the at least one processor, cause the at least one processor to perform operations including:

acquiring an image;

detecting an entire human body from the acquired image;

estimating a skeleton of the detected entire human body and generating skeleton information about the skeleton of the entire human body;

extracting a first feature quantity based on the generated skeleton information;

extracting a second feature quantity based on a clipped image including the detected entire human body; and estimating an orientation of the detected entire human body based on a third feature quantity in which the first and second feature quantities are connected, wherein the operations further include estimating, based on the third feature quantity, relation information about a relation between the entire human body and a background in which the entire human body is excluded from the clipped image, and wherein the relation information includes information for dividing the clipped image into the entire human body and a shadow of the human body.

2. The information processing apparatus according to claim 1, wherein the operations further include estimating whether the orientation of the detected entire human body is an orientation in which at least three points of the human body are in contact with a ground.

3. The information processing apparatus according to claim 1, wherein the relation information includes information for dividing the clipped image into the entire human body and the background.

4. The information processing apparatus according to claim 1, wherein the relation information includes information for dividing the clipped image into the entire human body and a floor surface.

5. The information processing apparatus according to claim 1, wherein the operations further include dividing the clipped image into an upper part of the human body, a lower part of the human body, a floor surface, and a wall surface.

6. The information processing apparatus according to claim 1, wherein the relation information includes an imaging angle of the clipped image.

7. The information processing apparatus according to claim 1, wherein the relation information includes depth information for the clipped image.

8. The information processing apparatus according to claim 1, wherein the extraction of the first feature quantity, the extraction of the second feature quantity, and the estimation of the human body are performed by using a trained neural network.

9. The information processing apparatus according to claim 1, wherein the estimation of the relation information is performed by using a trained neural network.

10. A method for estimating an orientation, the method comprising:

acquiring an image;

detecting an entire human body from the acquired image;

estimating a skeleton of the detected entire human body and generating skeleton information about the skeleton of the entire human body;

extracting a first feature quantity based on the generated skeleton information;

extracting a second feature quantity based on a clipped image including the detected entire human body; and estimating an orientation of the detected entire human body based on a third feature quantity in which the first and second feature quantities are connected, wherein the method further comprises estimating, based on the third feature quantity, relation information about a relation between the entire human body and a background in which the entire human body is excluded from the clipped image, and wherein the relation information includes information for dividing the clipped image into the entire human body and a shadow of the human body.

11. The method according to claim 10, wherein the method further comprises estimating whether the orientation of the detected entire human body is an orientation in which at least three points of the human body are in contact with a ground.

12. The method according to claim 10, wherein the relation information includes information for dividing the clipped image into the entire human body and the background.

13. The method according to claim 10, wherein the relation information includes information for dividing the clipped image into the entire human body and a floor surface.

14. The method according to claim 10, wherein the relation information includes an imaging angle of the clipped image.

15. The method according to claim 10, wherein the relation information includes depth information for the clipped image.

16. A non-transitory computer-readable storage medium storing a program for causing a computer to execute a method comprising:

acquiring an image;

detecting an entire human body from the acquired image;

estimating a skeleton of the detected entire human body and generating skeleton information about the skeleton of the entire human body;

extracting a first feature quantity based on the generated skeleton information;

extracting a second feature quantity based on a clipped image including the detected entire human body; and estimating an orientation of the detected entire human body based on a third feature quantity in which the first and second feature quantities are connected, wherein the method further comprises estimating, based on the third feature quantity, relation information about a relation between the entire human body and a background in which the entire human body is excluded from the clipped image, and wherein the relation information includes information for dividing the clipped image into the entire human body and a shadow of the human body.

* * * * *